United States Patent [19]

Plaiss

[11] 4,051,703
[45] Oct. 4, 1977

[54] BICYCLE LOCK

[76] Inventor: Charles E. Plaiss, 6834 W. Devon Ave., Chicago, Ill. 60631

[21] Appl. No.: 734,399

[22] Filed: Oct. 21, 1976

[51] Int. Cl.² .............................................. E05B 9/04
[52] U.S. Cl. ...................................... 70/371; 70/183;
70/211; 70/233; 70/379 R
[58] Field of Search ................. 70/379 R, 380, 364 R,
70/58, 168, 183, 211, 215, 233, 371, 185, 187,
186; 85/3 R, 3 K; 280/289 L

[56] References Cited

U.S. PATENT DOCUMENTS

| 742,562 | 10/1903 | Becraft | 70/168 X |
|---|---|---|---|
| 2,061,638 | 11/1936 | Segal | 70/371 |
| 3,386,273 | 6/1968 | Green | 70/168 |
| 3,863,472 | 2/1975 | Klingfus | 70/233 X |
| 3,910,081 | 10/1975 | Pender | 70/233 X |
| 3,988,912 | 11/1976 | Rogers | 70/364 R |

FOREIGN PATENT DOCUMENTS

| 879,297 | 10/1959 | United Kingdom | 70/364 R |

Primary Examiner—Roy D. Frazier
Assistant Examiner—William E. Lyddane
Attorney, Agent, or Firm—Rummler & Snow

[57] ABSTRACT

A removable lock for bicycles or the like wherein a portion of the lock housing extends into the interior of the tubular head or sleeve and the fork stem is locked therein to prevent rotation of said parts. Means are also provided on said lock housing for anchoring a wire rope or restraint to effectively prevent theft of the bicycle when the wire rope is wound around a metal post or rack.

2 Claims, 8 Drawing Figures

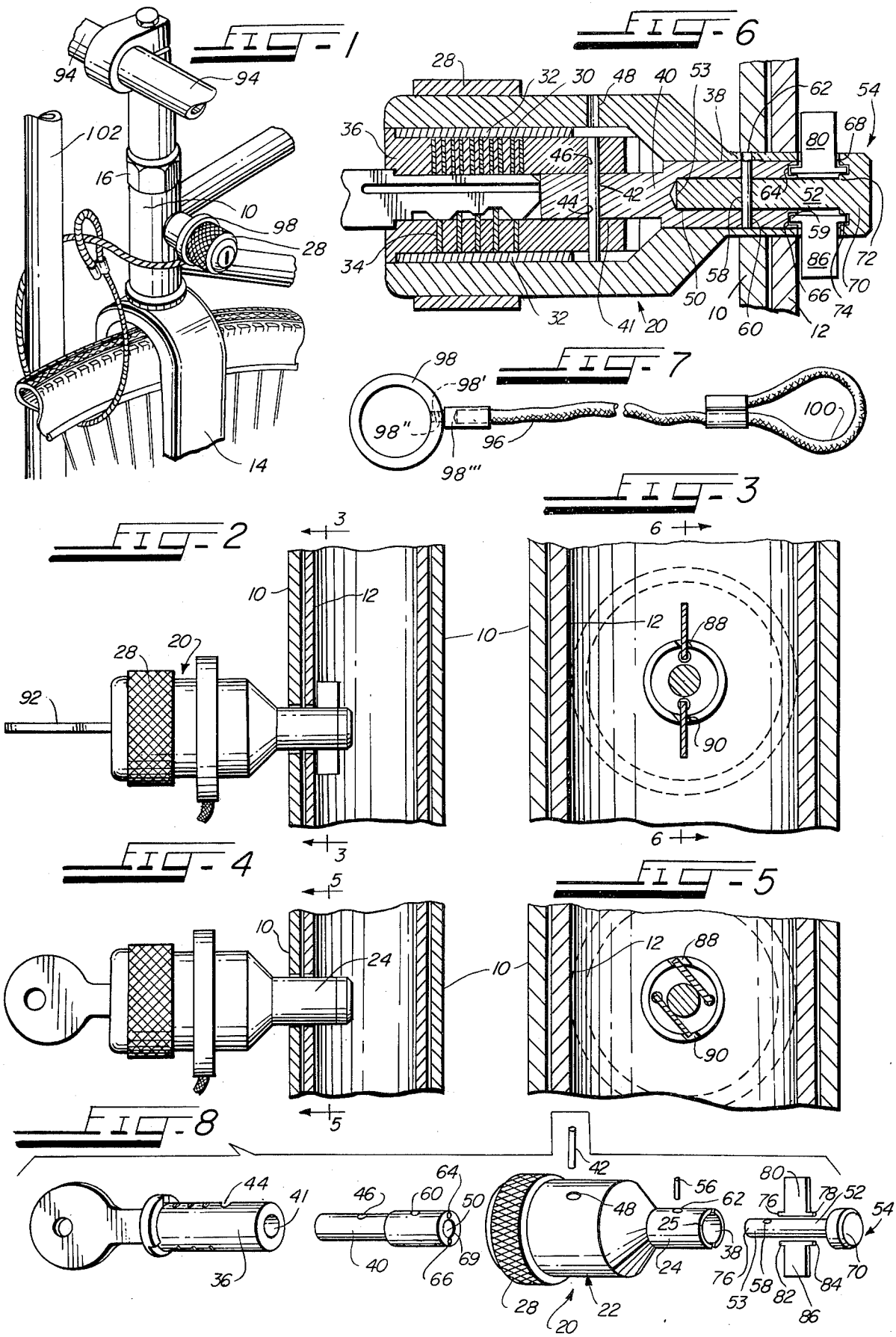

BICYCLE LOCK

This application relates to an improvement disclosed in my application Ser. No. 580,938 filed May 27, 1975 now U.S. Pat. No. 4,022,486.

SUMMARY OF THE INVENTION

A removable lock for mounting onto the head and steering post of a bicycle having an aperture drilled through the walls thereof in registry with each other to expose the interior of said post for the reception of a portion of said lock housing, said housing having a tumbler and housing axially arranged in one end of the housing and a rotary connecting rod secured thereto, said housing having a hollow offset portion containing a headed pin, the shank of said pin being partially inserted in and anchored to the free end of said connecting rod, a pair of latching means each pivotally secured, in opposed relationship, to the inner face of the head of said pin and the free end of said connecting rod, and opposed slots in the free end of said offset portion in said latch means seat whereby upon rotation of said tumbler said latch means both extend outwardly of said respective slots and retract in said slots.

BRIEF DESCRIPTION OF THE DRAWINGS

FIG. 1 is a perspective view of the forepart of a bicycle with the lock of the present invention in place and showing the wire rope secured around a stationary standard, parts being shown broken away;

FIG. 2 is a vertical cross-sectional view through the head of a bicycle and the stem of the front fork, the lock of the present invention shown in full lines with the latch in open position;

FIG. 3 is a cross-sectional view taken on the lines 3—3 of FIG. 2;

FIG. 4 is a view identical to FIG. 2 but showing the latch means retracted;

FIG. 5 is a cross-sectional view taken on the lines 5—5 of FIG. 4;

FIG. 6 is a cross-sectional view taken on the lines 6—6 of FIG. 2 on an enlarged scale;

FIG. 7 is a top elevational view of the wire ropes and appendages; and

FIG. 8 is an exploded view of the lock.

DETAILED DESCRIPTION OF THE DRAWINGS

Every bicycle is normally provided with a hollow head 10 and a hollow stem 12 of the fork 14 of the front wheel of the bicycle which is rotatably secured in the head 10 by the usual nut and locking ring 16.

The walls of the head and stem are bored simultaneously, as at 18, to expose the interior of the stem 12. The diameter of the bore is preferably 0.375 inches.

The lock has a housing 20 having an enlarged rear end 22 and a forward offset portion 24. The preferred diameter of the offset portion is about 0.3593 inches whereby it will be readily insertable in the aligned bores 18 as shown in the drawings. The outer surface of the enlarged portion 22 has a raised portion 28 integrally formed thereon.

The enlarged end 22 of housing 20 contains a large axial bore 30 wherein an elongated, inwardly extending plug 32 is formed. A set of tumblers 34 and tumbler housing 36 seat in the usual plug 32 in the enlarged bore 30 and between spaced guideways (not shown).

The offset end 24 of the housing 20 is also provided with an axial bore 38. A connecting rod 40 seats in the bore 38 and has one end secured to the bore 41 of the tumbler housing 36 by a case hardened rollpin 42 which seats in bores 44 and 46 and terminates in bore 30. The pin is forced therein through the perforation 48 in the housing 20, whereby it will rotate simultaneously with the tumbler housing 34 as if the connecting pin were integral therewith with the housing 36.

The connecting pin or rod 40 is partially axially bored as at 50 for the reception of one end 53 of the shank 52 of the headed pin 54 and it is anchored to the connecting pin or rod by a rollpin 56 which is inserted in the aligned apertures 58 and 60. The case hardened rollpin 56 is anchored by force fitting in the aligned apertures 58, 60 through a perforation 62 in the offset portion 24 of the housing 22 and hence the headed pin 54 will rotate with the connecting rod 40.

The free end 69 of the connecting rod 40 is provided with aligned spaced bores 64, 66. The inner surface 68 of the head 70 is also provided with spaced aligned bores 72, 74. The bores 64 and 72 are arranged to be opposed to each other as are the bores 66 and 74 whereby the short prongs 76, 78 of the latching member 80 will rotatably seat in the bores 64, 72 and the short prongs 82, 84 of latch member 86 will rotatively seat in the opposed bores 66, 74. It is to be noted from FIG. 6 that the depth of bore 50 is such that when the end 53 of the shank 52 of the headed pin 54 is seated in the bottom of the bore 50, the space between the inner face 68 and the end surface 69 is such as to readily accommodate the width of the latch members 80, 86 plus a fraction of an inch.

The offset portion 24 of the housing 20 contains a pair of angular slots 88, 90 in the free end 25 thereof and are diametrically opposed to each other, with the free ends of the latch members housed therein, when the lock is in closed position as shown in FIG. 5.

When the key 92 is rotated 90°, the latch housing 36, the connecting rod 40, the pin 52 will all rotate 90° causing the free ends of the latch members 80, 86 to shift outwardly from the slots 88, 90. (See FIGS. 2, 3, and 6.)

Thus, when the offset member 24 is inserted in the aligned apertures 18 of the head 10 and stem 12 and the latch members 80, 86 are shifted outwardly to latch position, as shown in FIGS. 2, 3 and 6, and the key 92 removed, the stem 12 cannot be rotated in the head 10 by rotation of the handlebars 94.

To affix the lock to a permanent standard like a light standard or bike rack, an elongated cable 96, having a collar 98 integrally secured to one end and a permanent loop 100 on the opposite end, is utilized. The collar or ring 98 is bored and tapped as at 98' in the side wall to accept the threaded end 98" of rod 98'". The rod is bored axially at the end opposite the threaded end to receive one end of the ⅜ inch cold rolled steel rod cable 96. The cable is secured therein by pressing the end of the rod and cable in three positions under extreme pressure. Thus the rod and cable are squeezed together to make them integral. The loop end is first placed around a light pole 102 or bike rack or the like immovable object, the front wheel of the bicycle, and the collar 98 is threaded through the loop 100 and then slipped on the enlarged portion 22 of the housing 20, whence the offset end 24 is inserted in the aligned apertures 18, the key 92 turned 90° and removed. The latch plates 80, 86 will move outwardly with the turning of the key 92, as hereinbefore explained, and the bicycle is securely locked in place when the key is removed. Even if someone had means to cut the cable 96, the front wheel would remain securely locked in place because it cannot be rotated.

The latch members 80, 86 are constructed of case hardened steel and are nonflexible. No outward thrust of the housing, which is constructed of case hardened and plated steel, can upset the latch members since, as viewed in the drawings, such thrust would be against one side wall of each of the latch members. Each latch member is about 0.047 inches in thickness, with a width of about 0.275 inches and the height about 0.198 inches. The length of each prong 76, 78, 82 and 84 is approximately 0.075 inches. The pins 42, 56 are also constructed of spring tempered and blued steel, as in the housing 20, connecting rod 40 and headed pin 54, to make the device substantially invulnerable to theft.

Although but one specific embodiment of this invention is herein shown and described, it will be understood that details of the construction shown may be altered or omitted without departing from the spirit of the invention as defined by the following claims.

I claim:

1. A lock for bicycles comprising a cylindrical housing having an enlarged rear end and an integrally-formed forward reduced end, said enlarged end having a large axial bore, said reduced end having a smaller axial bore therein communicating with said large bore, a tumbler mechanism inserted in said large bore and secured thereto, said tumbler mechanism having a housing including an axial bore, a connecting rod secured at one end in said tumbler housing bore and having a face on its opposite end, said connecting rod having an axial bore in said opposite end and said rod partially seated in said bore in said reduced end of said housing, a pin having a shank and a head, said head including an inner face on the side adjacent said shank, a part of said shank anchored in said bore of said connecting rod, a pair of aligned bores in said opposite end face of said connecting rod, a pair of aligned bores in the inner face of said head, a pair of latching members, each latching member having laterally-extending prongs at one end, the prongs being rotatively seated in opposed aligned bores in said inner face of said head and said opposite end face of said connecting rod, a pair of angularly-aligned slots in said reduced end of said housing whereby said latch members are each seated in one of said slots and projected outwardly thereof upon rotation of said tumbler housing which simultaneously rotates the connecting rod and pin.

2. The device according to claim 1 wherein said connecting rod and tumbler housing are secured together by a rollpin driven therein through an aperture in the enlarged end of said housing, and said connecting rod is secured to said shank of said headed pin by a rollpin driven therein through an aperture in the reduced end of said housing.

* * * * *